Jan. 29, 1963 G. E. KURILUK 3,075,557
COMBINATION HANDLE AND MIXING VALVE
Filed Jan. 18, 1960 2 Sheets-Sheet 1
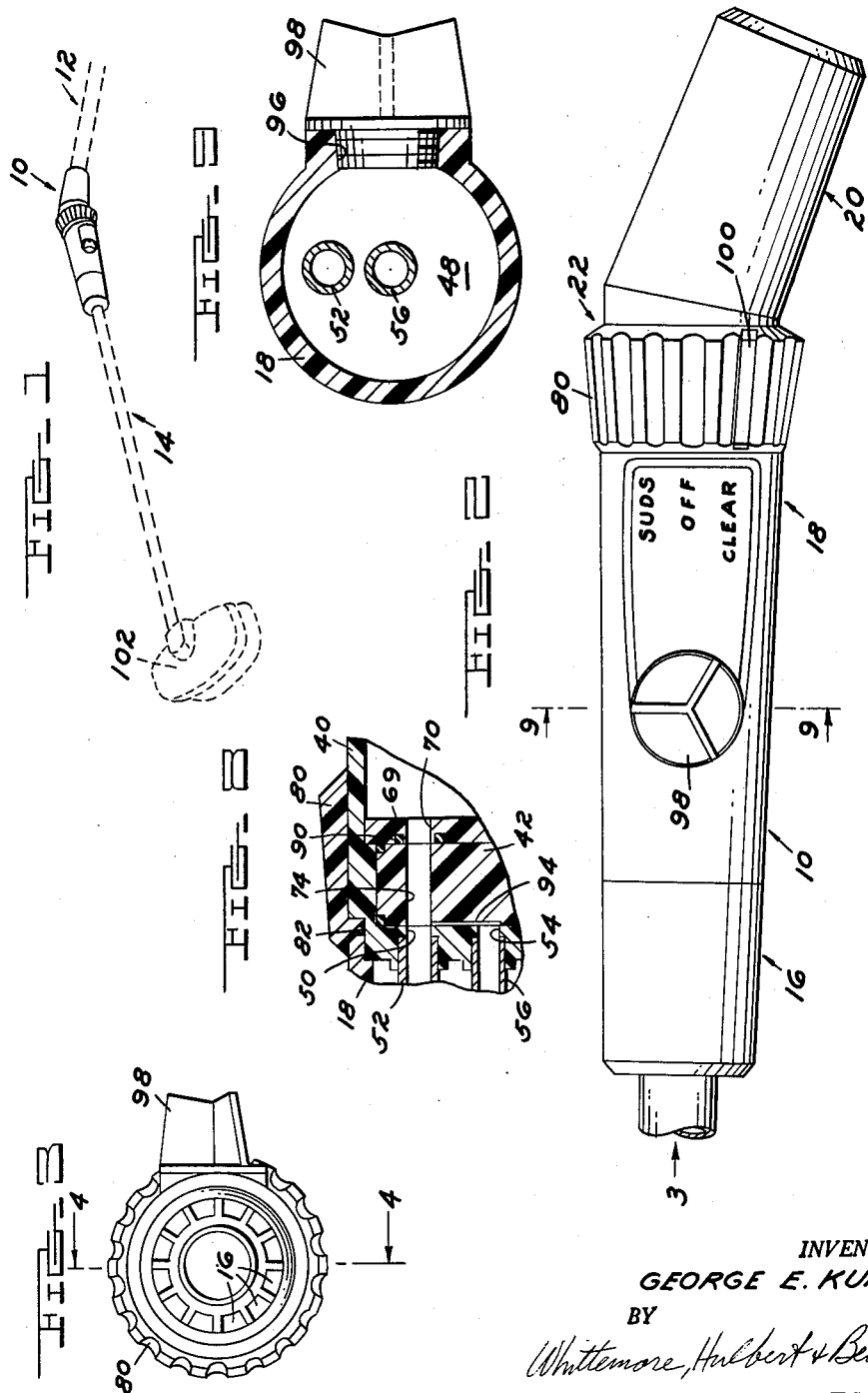
INVENTOR.
GEORGE E. KURILUK
BY
Whittemore, Hulbert & Belknap
ATTORNEYS

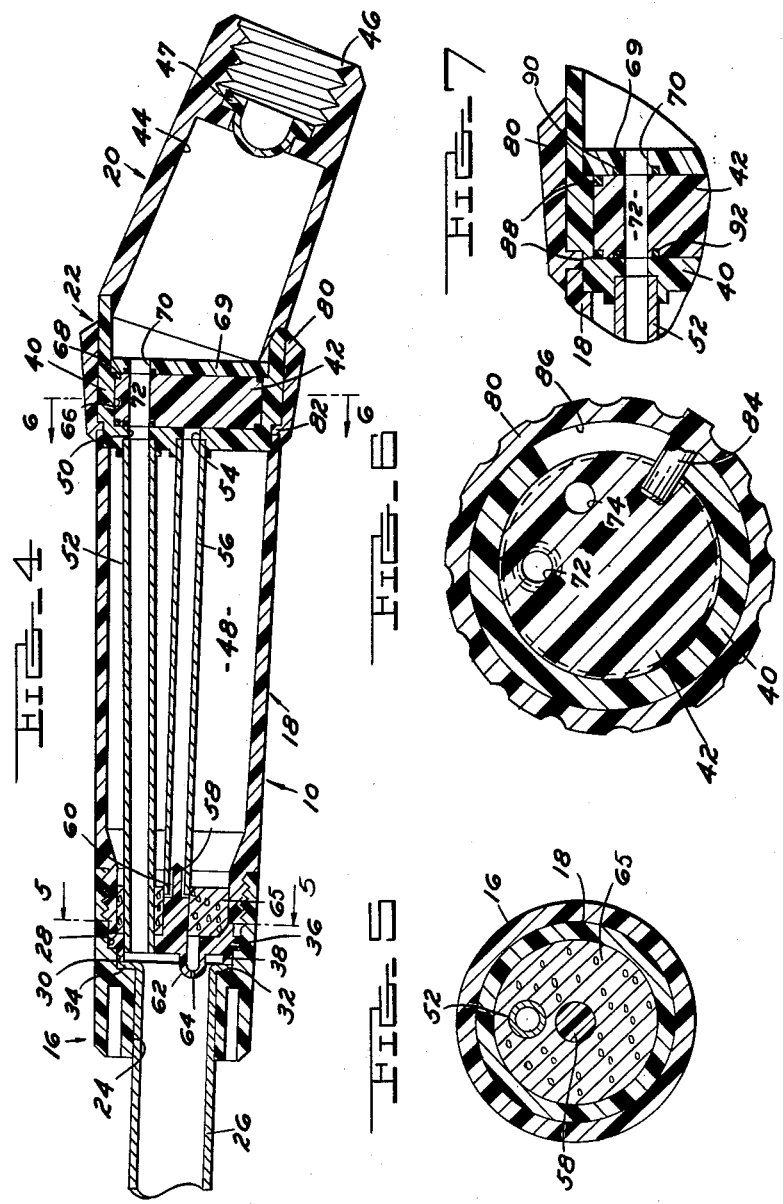

3,075,557
COMBINATION HANDLE AND MIXING VALVE
George E. Kuriluk, Fair Haven, Mich., assignor to Laitner Brush Company, Detroit, Mich., a corporation of Michigan
Filed Jan. 18, 1960, Ser. No. 3,013
10 Claims. (Cl. 137—625.31)

This invention relates generally to a flow control device and refers more particularly to a flow control device of the type incorporating a mixing valve.

One object of the invention is to provide a flow control device adapted for use with a fluid conduit, such as an ordinary garden hose, having selectively operable means for mixing a desired ingredient, such as soap, fertilizer, weed killer, etc., with the fluid issuing from a conduit.

Another object of the invention is to provide a control device of the type described above in the form of a housing containing both a reservoir chamber for liquid soap or other substance to be mixed, and a mixing valve.

A further object of the invention is to provide a control device as described above in which the housing is shaped to provide a handle which may be comfortably gripped in the hand.

A still further object of the invention is to provide a flow control device comprising a housing defining a chamber for liquid soap and also defining a water inlet passage, a water outlet passage having a first tube extending through the chamber, a second tube extending into the chamber, a valve between the chamber and the inlet passage for controlling communication between the inlet passage and tubes, in one of its positions the valve being operable to connect the inlet passage and first tube while sealing the second tube from the inlet passage and in another position being operable to connect the inlet passage with both of the tubes, and means providing an outlet from the chamber leading to the outlet passage. In the second position of the valve, part of the water is diverted through the soap chamber and then returned to the outlet passage.

Another object of the invention is to provide means preferably in the form of a sponge for controlling the amount of soap mixed with the water issuing from the outlet passage.

Other objects and features of the invention will become apparent as the description proceeds, especially when taken in conjunction with the accompanying drawings, illustrating a preferred embodiment of the invention, wherein:

FIG. 1 is a perspective view illustrating a flow control device embodying my invention, and shown in association with an ordinary garden hose and brush unit which appear in dotted lines;

FIG. 2 is a side elevational view of the flow control device;

FIG. 3 is an end view of the control device looking in the direction of the arrow 3 in FIG. 2;

FIG. 4 is similar to FIG. 2 but is shown in longitudinal section;

FIG. 5 is a sectional view taken on the line 5—5 of FIG. 4;

FIG. 6 is a sectional view taken on the line 6—6 of FIG. 4;

FIG. 7 is an enlarged fragmentary view of a portion of FIG. 4;

FIG. 8 is similar to FIG. 7 but shows the valve in a different position; and

FIG. 9 is a sectional view taken on the line 9—9 in FIG. 2.

Referring now more particularly to the drawings, the flow control device of my invention is generally indicated at 10 and in FIG. 1 is shown in association with an ordinary garden hose 12 and a brush unit 14.

The flow control device 10 comprises a housing made up of a front housing section 16, an intermediate housing section 18 and a rear housing section 20. A mixing valve 22 is interposed between the intermediate and rear housing sections 18 and 20.

The front housing section is tubular to provide a through passage or bore of varying diameter. Thus the front section of the bore is of reduced diameter as shown at 24 to receive the end of a rigid tube 26 which forms a part of the brush unit 14. The rear end portion of the bore is of enlarged diameter as shown at 28 and is internally threaded for threaded engagement with the front end of the intermediate housing section 18. The intermediate portion of the bore is of a diameter between that of the bore portions 24 and 28 as shown at 30, and a shoulder 32 defined between the bore portions 24 and 30 provides an abutment engageable with the out-turned annular flange 34 on the rear end of tube 26 to prevent its withdrawal. A circular disk 36 of rubber or like material is received in the bore portion 28 and clamped in position between the front end of the intermediate housing section 18 and the shoulder defined between the bore portions 28 and 30. The disk has an annular rib 38 which projects forwardly and engages the flange 34 of tube 26 to hold it in position.

The mixing valve 22 comprises a cup-shaped casing 40 and a rotatable valve element 42 received therein. The side wall of the casing has a cylindrical outer surface which at its front end is of reduced diameter for reception within the counterbore in the rear end of the intermediate housing section 18. Preferably the casing 40 of the mixing valve is glued to the intermediate housing section 18.

The rear housing section 20 is tubular and has an enlarged chamber 44 and a threaded passage 46 leading into the chamber. An ordinary garden hose or like fluid conducting element is adapted to be threaded into the passage 46. Preferably the front end of the rear housing section 20 is secured to the casing 40 by glue. The numeral 47 designates a washer inserted in housing section 20. The rim of this washer is engaged by the end of the hose to provide a seal, and the central nipple portion is slit to allow water issuing from the hose to pass into chamber 44. The washer acts as a check valve and prevents reverse flow.

The intermediate housing section 18 is tubular and in cooperation with the casing 40 of the mixing valve and the circular disk 36 defines a soap chamber 48. The chamber 48 provides a reservoir for liquid soap or detergent. It will of course be obvious that instead of soap or detergent other substances such as fertilizer or weed killers, for example, may be contained in the reservoir 48.

As before stated, the valve casing 40 is generally cup shaped, and the bottom of the cup defines the rear end of the soap chamber. This transverse bottom wall of the casing defining the rear of the soap chamber has a passage 50 therein which is counterbored to receive the rear end of a tube 52 passing through the soap chamber. The front end of tube 52 extends into and through a passage in the circular disk 36, thereby communicating with the rigid tube 26 of the brush unit. The transverse wall of the valve casing 40 has a second passage 54 which is counterbored to receive the rear end of a tube 56 which also extends through the soap chamber. The front end of the tube 56 is supported on a rearwardly projecting pilot portion 58 of the circular disk 36. The pilot is fluted as indicated at 60 to provide communication between the interior of tube 56 and soap chamber 48. The tubes are secured to the disk 36 and valve casing 40 by suitable means such as glue.

The circular disk 36 is formed with a forwardly projecting nipple 62 which is formed with an outlet slit 64. A sponge 65 is disposed in the chamber 48 at the front end thereof against the circular disk 36 and is of a diameter to completely fill that end of the chamber, being formed with suitable apertures to clear the pilot projection 58 and tube 52. Hence any soap or water leaving the chamber 48 by way of the nipple 62 must pass through the sponge.

The valve casing 40 has an internal cylindrical surface 66 adjacent to its transverse wall in which is rotatably received the cylindrical valve element 42. The internal surface 66 is counterbored to provide an abutment shoulder 68, and a retainer disk 69 is received in the counterbore against the shoulder 68 to hold the valve element 42 in position within the casing. The retainer is preferably glued in position and has an aperture 70 in axial alignment with the aperture 50 in the transverse wall of the casing 40. The valve element 42 has a pair of through passages 72 and 74. The passages 72 and 74 are angularly spaced from each other and are spaced from the axis of rotation of the valve element an equal distance such that they may be rotated into registration with the aligned passages 50 and 70 in the transverse wall of the valve casing 40 and in the retainer disk 69 respectively. A ring 80 is rotatable on the cylindrical side wall of the casing 40 and has an internal rib 82 confined between the rear end of the intermediate housing section and a shoulder on the valve casing. The rib retains the ring against axial movement but does not interfere with the free rotation thereof. A pin 84 connects the ring 80 and valve element 42 so that rotation of the ring is imparted to the valve element. A slot 86 in the side wall of the valve casing 40 is provided to clear the pin 84, and the opposite ends of the slot are engaged by the pin to determine the limits of rotation of the valve element. At one limit of rotation shown in FIG. 6, the passage 72 is aligned with passages 50 and 70, and in the other limit of rotation in which pin 84 engages the other end of the slot, passage 74 is aligned with passages 50 and 70 as shown in FIG. 8.

The valve element 42 is provided on opposite ends with the peripheral O-ring seals 88 which are received in suitable grooves in the valve element. These seals engage the transverse wall of the casing 40 and the front face of the retainer disk 69 to prevent leakage. The retainer disk 69 has an annular groove in its front face surrounding passage 70 in which is received an O-ring seal 90 engageable with the rear face of the valve element, and the front face of the valve element is formed with an annular groove around passage 72 in which is received an O-ring seal 92 engageable with the rear face of the transverse wall of valve casing 40. These seals prevent the escape of water from the various passages. The front face of the valve element 42 is also formed with a shallow radial recess 94 which extends from the passage 74 to the axis of rotation of the valve element. The radially inner end of the recess overlaps the central passage 54 in the transverse wall of casing 40 in all positions of the valve element.

The chamber 48 for liquid detergent is adapted to be filled through a lateral port 96 in the intermediate section of the housing. This port is normally closed by a threaded cap 98.

It will be noted in FIGS. 1, 2 and 4 that the flow control device 10 provides in effect a pistol grip and is therefore conveniently gripped in the hand as a handle. The handle is probably most conveniently gripped at the rear end, with the palm and fingers surrounding the rear housing portion 20 and the thumb extending along the control ring 80. As shown in FIG. 2, the intermediate housing section 18 may if desired be marked with suitable indicia to facilitate the setting of the mixing valve. The control ring 80, which is grooved in its outer surface so that it may be more readily manipulated, has an elongated element or pin 100 preferably of a different color than the rest of the ring to serve as an indicator. In FIG. 2, the indicator pin 100 shows that the mixing valve is set to allow clear water to flow through the control device and into the tube 26 of the brush unit. A "suds" position is also shown in which soapy water will be conducted to the brush unit, and the "off" position completely blocks the passage of fluid.

In use, a garden hose 12 or like fluid conductor is threaded into the end of the rear housing section 20 in sealing engagement with washer 47. In the position of the mixing valve shown in FIG. 2 in which clear water is desired, the internal parts will be positioned as shown in FIGS. 4 and 7 in which the clear water may pass through passages 70, 72, 50, tube 52 and tube 26 of the brush unit from whence it may issue from the head 102 of the brush unit.

The control ring 80 may be rotated to the "suds" position shown in FIG. 8. In this position of the valve element, passage 74 thereof is axially aligned with passages 50 and 70 in the valve casing 40 and retainer disk 69 respectively. In this position of the valve element, clear water will pass through the passages 70, 74, 50, and tubes 52 and 26 to the head of the brush unit. A small amount of water will also pass into the central tube 56 through the shallow recess 94 in the front face of the valve element. This small amount of water thus diverted will pass into the soap chamber 48 through the pilot flutes 60 and sponge, and from the soap chamber back through sponge 65, nipple 62 into the tube 26 of the brush unit. The sponge actually covers the flutes 60 (FIG. 4) thereby restricting the water entering the soap chamber. The sponge 65 also limits the amount of soapy water that can pass from the soap chamber via nipple 62. The water in the chamber, added to the soap or detergent therein, builds up a slight pressure sufficient to force a sudsy water through the sponge and from nipple 62. Without the sponge, it has been found that soapy water in excess of normal needs is obtained and the soap is used up rapidly. The sponge therefore limits the rate at which the soap is used up, thereby requiring less frequent filling of the soap chamber.

It will thus be seen that in both the clear water position and in the suds position of the mixing valve, clear water passes through tube 52 to the brush unit. In the clear position, water cannot pass to the central tube 56 which leads to the soap chamber because of the seal 92. In the suds position, no seal surrounds the passage 74 in the valve element and in fact a recess 94 is provided to connect passage 74 and the central tube 56. In some instances it has been found that the recess 94 can be eliminated and that a normal amount of looseness between the valve element and the transverse wall of the valve casing is sufficent to divert the necessary amount of water to the central passage 56. However in the interest of better control and regulation, a recess 94 of predetermined depth is preferred.

In the off position of the valve element, both passages 72 and 74 are out of alignment with the through passages 50 and 70, and such passages are in fact sealed from one another by an imperforate portion of the valve element. In this off position of the valve element, the circular O-ring seal 90 in the retainer disk 69 seals against the valve element to prevent leakage.

The mixing valve is separated from the soap chamber so that the soap cannot gum up the movable valve parts. The valve 62 providing an outlet from the soap chamber is preferably a slit as shown. While a small hole might be employed, it has been found when the valve is set to deliver clear water, the moving water in tube 26 produces a pressure drop oftentimes sufficient to draw soap from the chamber. The slit 64 normally seals off the soap chamber and will not open in response to the slight pressure drop in tube 26. However, the pressure build-up of water in the soap chamber, on "suds" position, will open the slit.

Obviously the unit described could be used to dispense other material such as fertilizer or weed killer, for example, instead of soap.

What I claim as my invention is:

1. A flow control device comprising an elongated housing defining an elongated chamber for liquid soap, or the like, said housing having at one end a liquid inlet passage, means providing a liquid outlet passage including a first tube extending longitudinally through said chamber, a second tube paralleling the first extending within said chamber and opening thereinto, a valve in said housing between said chamber and inlet passage for controlling communication between said inlet passage and said first and second tubes, said valve having a manually adjustable valve element, said valve element being operable in one position to connect said inlet passage and first tube while sealing said second tube from said inlet passage and in another position being operable to connect said inlet passage with both of said tubes, means providing an outlet from said chamber leading to said outlet passage, said valve element being formed with a recess connecting said inlet passage and second tube in the second mentioned position thereof, said valve element having a third position sealing said inlet passage, a sponge for controlling the flow from said chamber to said outlet passage, means defining ports providing for communication between said second tube and said chamber, and between said outlet from said chamber and said outlet passage, said sponge being disposed in said chamber in overlying relation to said ports.

2. A flow control device comprising an elongated housing defining an elongated chamber for liquid soap, or the like, said housing having at one end a liquid inlet passage, means providing a liquid outlet passage including a first tube extending longitudinally through said chamber, a second tube paralleling the first extending within said chamber and opening thereinto, a valve in said housing between said chamber and inlet passage for controlling communication between said inlet passage and said first and second tubes, said valve having a manually adjustable valve element, said valve element being operable in one position to connect said inlet passage and first tube while sealing said second tube from said inlet passage and in another position being operable to connect said inlet passage with both of said tubes, means providing an outlet from said chamber leading to said outlet passage, a sponge for controlling the flow from said chamber to said outlet passage, and means defining ports providing for communication between said second tube and said chamber, and between said outlet from said chamber and said outlet passage, said sponge disposed in said chamber in overlying relation to said ports.

3. A device for controlling the flow of a liquid and for selectively mixing a substance therewith; said device comprising a housing defining a chamber for the substance to be mixed, means providing a liquid inlet, means providing a liquid outlet passage, means providing a second passage leading into said chamber, an adjustable valve controlling communication between said inlet and said passages, said valve in one position being operable to connect said inlet and said outlet passage while sealing said second passage and in another position being operable to connect said inlet with both passages, means defining a port providing communication between said second passage and said chamber, means providing an outlet port from said chamber leading to said outlet passage, said ports being close together and a porous flow-restricting member within said chamber overlying both said ports.

4. A device for controlling the flow of a liquid and for selectively mixing a substance therewith; said device comprising means defining a chamber for the substance to be mixed and having first and second end walls, a third wall spaced beyond said first chamber wall and cooperating therewith to define a valve housing, a rotary valve in said valve housing, aligned ports in said first, second, and third walls spaced radially outwardly from the axis of rotation of said valve, an inlet for liquid communicating with said port in said third wall, a liquid outlet beyond said second chamber end wall, a conduit extending across said chamber and communicating at its ends with said ports in said first and second chamber end walls, angularly spaced passages in said valve respectively registrable with said ports in said first and third walls in two different positions of rotation of said valve to establish communication between said inlet and outlet through said conduit, a fourth port in said first chamber end wall leading into said chamber and located on the axis of rotation of said valve, radial passage means providing communication between one of said passages and said fourth port, and a port from said chamber leading to said outlet.

5. The device defined in claim 4 wherein said radial passage means is defined between the adjacent surfaces of said valve and said first chamber end wall.

6. The device defined in claim 4 wherein said valve has a radial groove in the surface thereof adjacent said first chamber end wall extending from the said one of said passages to said fourth port and cooperating with said first chamber end wall in the definition of said radial passage means.

7. A device for controlling the flow of a liquid and for selectively mixing a substance therewith; said device comprising means defining a chamber for the substance to be mixed, means providing an inlet at one end of said chamber and an outlet at the other end thereof, a conduit extending through said chamber from said one end thereof to the other in open communication with said outlet at said other end of said chamber, a rotary valve at said one end of said chamber, in two angularly spaced positions of rotation said valve being operable to place said inlet and said conduit in communication, a duct in said one end of said chamber leading to the interior of said chamber, said valve being constructed to seal said duct from said inlet in one of the two angularly spaced positions thereof and to open communication between said duct and said inlet in the said other position thereof, a port from said chamber leading to said outlet, said duct in said one end of said chamber being located on the axis of rotation of said valve and said conduit being spaced radially outwardly from said axis, said valve having passages therein respectively registrable with said conduit in the two aforesaid angularly spaced positions thereof to establish communication between said inlet and said conduit, and radial passage means from one of said first-mentioned passages to said axis of rotation for establishing communication between said inlet and said duct through the said one of said first-mentioned passages when the latter is in register with said conduit.

8. A device for controlling the flow of a liquid and for selectively mixing a substance therewith; said device comprising means defining a chamber for the substance to be mixed, means providing an inlet at one end of said chamber and an outlet at the other end thereof, a conduit extending through said chamber from said one end thereof to the other in open communication with said outlet at said other end of said chamber, a rotary valve at said one end of said chamber, in two angularly spaced positions of rotation said valve being operable to place said inlet and said conduit in communication, a duct in said one end of said chamber leading to the interior of said chamber, said valve being constructed to seal said duct from said inlet in one of the two angularly spaced positions thereof and to open communication between said duct and said inlet in the said other position thereof, a port from said chamber leading to said outlet, said duct extending from said one end of said chamber to the other end thereof and being supported by said chamber ends in parallel relation to said conduit, a port in said duct opening into said chamber, and a porous flow-restricting member in said chamber overlying said first-mentioned port.

9. The device defined in claim 8, wherein said first-mentioned port is located in the said other end of said chamber and said second-mentioned port is located near said other end of said chamber, and said porous flow-restricting member overlies both said ports.

10. A device for controlling the flow of a liquid and for selectively mixing a substance therewith; said device comprising means defining a chamber for the substance to be mixed, means providing an inlet at one end of said chamber and an outlet at the other end thereof, a conduit extending through said chamber from said one end thereof to the other in open communication with said outlet at said other end of said chamber, a rotary valve at said one end of said chamber, in two angularly spaced positions of rotation said valve being operable to place said inlet and said conduit in communication, a duct in said one end of said chamber leading to the interior of said chamber, said valve being constructed to seal said duct from said inlet in one of the two angularly spaced positions thereof and to open communication between said duct and said inlet in the said other position thereof, a port from said chamber leading to said outlet, said valve having passages therein respectively registrable with said conduit in the two aforesaid angularly spaced positions thereof to establish communication between said inlet and said conduit, and a branch passage from one of said first-mentioned passages for establishing communication between said inlet and said duct through the said one of said first-mentioned passages when the latter is in register with said conduit.

References Cited in the file of this patent

UNITED STATES PATENTS

| | | |
|---|---|---|
| 1,532,809 | Girard | Apr. 7, 1925 |
| 2,301,691 | Ellinger | Nov. 10, 1942 |
| 2,401,914 | Di Pietro | June 11, 1946 |
| 2,538,850 | Simms | Jan. 23, 1951 |
| 2,602,697 | Otto | July 8, 1952 |
| 2,602,699 | Otto | July 8, 1952 |
| 2,639,945 | Rowlett | May 26, 1953 |
| 2,711,928 | Randa | June 28, 1955 |
| 2,908,290 | Hamilton-Peters | Oct. 13, 1959 |